United States Patent [19]

Chandos et al.

[11] Patent Number: 5,588,059
[45] Date of Patent: Dec. 24, 1996

[54] COMPUTER SYSTEM AND METHOD FOR SECURE REMOTE COMMUNICATION SESSIONS

[75] Inventors: Ronald V. Chandos, Tempe; Robert I. Foster, Mesa, both of Ariz.

[73] Assignee: Motorola, Inc., Schaumburg, Ill.

[21] Appl. No.: 398,181

[22] Filed: Mar. 2, 1995

[51] Int. Cl.$^6$ ............................... H04L 9/00; H04L 9/08
[52] U.S. Cl. .............................. 380/21; 380/25; 380/45; 380/49
[58] Field of Search ............................... 380/21, 25, 45, 380/49

[56] References Cited

U.S. PATENT DOCUMENTS

| | | | |
|---|---|---|---|
| 3,931,504 | 1/1976 | Jacoby | 235/153 R |
| 4,238,853 | 12/1980 | Ehrsam et al. | 375/2 |
| 4,262,239 | 4/1981 | Bright et al. | 364/200 |
| 4,310,720 | 1/1982 | Check, Jr. et al. | 178/22.08 |
| 4,317,957 | 3/1982 | Sendrow | 178/22.08 |
| 4,430,728 | 2/1984 | Beitel et al. | 364/900 |
| 4,531,023 | 7/1985 | Levine | 179/2 R |
| 4,679,226 | 7/1987 | Muehleisen | 379/95 |
| 4,707,804 | 11/1987 | Leal | 340/825.32 |
| 4,733,345 | 3/1988 | Anderson | 380/25 |
| 4,882,752 | 11/1989 | Lindman et al. | 380/25 |
| 4,888,800 | 12/1989 | Marshall et al. | 380/21 |
| 4,916,738 | 4/1990 | Chandra et al. | 380/25 |
| 4,926,481 | 5/1990 | Collins, Jr. | 380/25 |
| 4,962,449 | 10/1990 | Schlesinger | 364/200 |
| 5,144,665 | 9/1992 | Takaragi et al. | 380/30 |
| 5,179,591 | 1/1993 | Hardy et al. | 380/21 |
| 5,251,258 | 10/1993 | Tanaka | 380/21 |
| 5,341,426 | 8/1994 | Barney et al. | 380/21 |

*Primary Examiner*—Thomas H. Tarcza
*Assistant Examiner*—Pinchus M. Laufer
*Attorney, Agent, or Firm*—Bradley J. Botsch, Sr.

[57] ABSTRACT

A computer system includes a Key Certification Agency (KCA) (12), a host computer (16), and a number of remote terminals (14). The KCA (12) uses incompatible encryption processes (96, 98) to encrypt session control data and to store the data as various messages (44, 46, 48) in a user token (26). The token (26) may be removably installed in any remote terminal (14). To set up a communication session, the token uncovers one of the messages (48) using a crypto-uncovering agent which is known to the user. This message includes a remote traffic key after deciphering, but the key is never transmitted to the host. The host (16) deciphers the other messages (44, 46) and constructs a host traffic key in response to data contained therein. No plain text is transmitted during the setup or the session.

14 Claims, 6 Drawing Sheets

COMPUTER SYSTEM AND METHOD FOR SECURE REMOTE COMMUNICATION SESSIONS

TECHNICAL FIELD OF THE INVENTION

The present invention relates generally to providing security for computer systems in which remote terminals communicate with host computers.

BACKGROUND OF THE INVENTION

Prior art industrial security systems typically ignore significant security threats, particularly in connection with communication sessions conducted with remote terminals. For example, prior art systems often implement an authentication procedure, but ignore session security. Authentication procedures attempt to determine whether an authentic user rather than an impostor or hacker is attempting to access the system. Session security refers to the transmission of encrypted data during a communication session. In a typical authentication process, a user supplies authentication data which must match like authentication data stored at a host computer. Consequently, the host computer is vulnerable to hacking activities which may access the authentication data stored therein.

In addition, prior art systems often transmit passwords, personal identification numbers, encryption keys, and the like in the clear between a remote terminal and a host. Such data items are commonly used to determine authenticity. However, prior art systems are often vulnerable to eaves dropping by wire tapping or RF reception. Eaves dropping is a serious and likely threat for remote communication sessions, and becomes an even greater threat when remote communications take place over RF communication links. Eaves dropping may allow an impostor or hacker to learn all data being transferred during the communication session. In addition, eaves dropping may further allow an impostor or hacker to duplicate the passwords, personal identification numbers, encryption keys, and the like that will trick the host into later granting access to the impostor.

Automatic call-back represents another technique often adopted to help determine authenticity. With automatic call-back, when a remote terminal calls a host computer via phone lines, a host computer terminates the call and automatically calls a predetermined phone number. If the calling party is authentic, the called back number should be for the remote terminal. However, this technique is vulnerable to call-forwarding at the predetermined phone number, and it severely limits mobility of the remote user.

A few prior art systems have attempted to provide session security. However, such systems require security-critical remote terminals. Security-critical terminals include data which, if discovered by an impostor or hacker, will allow the impostor or hacker to access the host. Consequently, the remote terminals are a potential point of attack. To combat this vulnerability, the security-critical remote terminals are often bulky, physically secure housings which make tampering difficult and evident should it occur. The bulkiness of typical security-critical remote terminals tends to make them less mobile than many remote computer system users require.

SUMMARY OF THE INVENTION

Accordingly, it is an advantage of the present invention that an improved method and apparatus for secure remote communication sessions are provided.

Another advantage is that the present invention provides both authentication and session security.

Another advantage is that the present invention promotes mobility of a remote terminal.

Another advantage is that the present invention promotes ease of use by host computer and remote terminal users.

Another advantage is that security-critical data are maintained and managed independently from a host computer and from remote terminals.

The above and other advantages of the present invention are carried out in one form by a method for operating a calling node to provide user authentication and communication security for a communication session between the calling node and a called node. The method calls for storing encrypted user identifying data at the calling node. In addition, an encrypted traffic key is stored at the calling node. The encrypted user identifying data from the calling node are sent to the called node. A crypro-uncovering agent is obtained from a user of the calling node. The traffic key is deciphered in response to the crypto-uncovering agent to obtain a deciphered traffic key.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
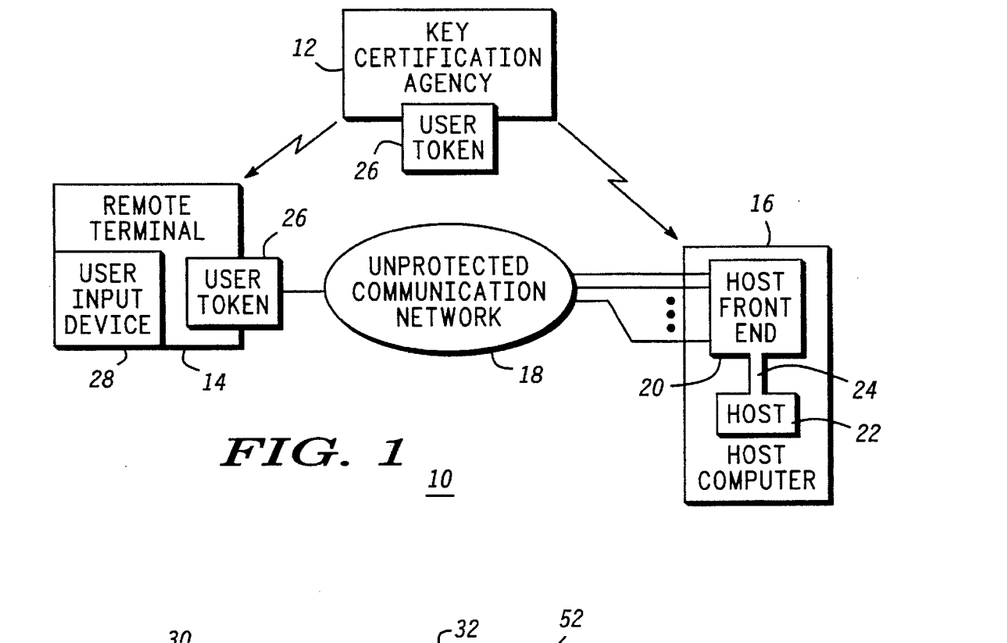
FIG. 1 shows a block diagram of a computer system in which the present invention may be practiced.

FIG. 1 shows a block diagram of a computer system 10. System 10 includes a key certification agency (KCA) 12, any number of remote terminals 14, and a host computer 16. Remote terminals 14 communicate with host computer 16 through an unprotected communication network 18, such as the public switched telecommunications network. Host computer 16 includes a host front end 20, which has a modem bank interface to network 18. Host front end 20 couples to a host 22 through a bus 24. Within computer system 10, communication sessions take place to let remote terminals 14 and users thereof access host 22 and receive the data processing services thereof.

KCA 12 manages remote communication session access security and session security for system 10 and represents the most security critical component of system 10. It is used to enroll users into the system, but is not needed during the actual user session with the host 22. KCA 12 may be implemented using conventional mass market computer hardware. In a preferred embodiment, KCA 12 is implemented in a conventional laptop computer. When KCA 12 is not in use, it may be locked in a safe to insure that it is not tampered with or otherwise accessed by unauthorized persons. KCA 12 may also serve as one of remote terminals 14 in system 10.

By implementing KCA 12 independently from remote terminals 14 and host 22, security for system 10 may be managed independently from host 22. Thus, as an example, an organization may assign KCA 12 to a security department and host 22 to a computer administration or other department. Security department personnel, who may better appreciate security concerns, can be relied upon to maintain security, and those who operate host 22 need not be relied upon to maintain critical security components.

KCA 12 manages and distributes cryptographic keys used in remote terminals 14 and in host front end 20. The cryptographic keys may be physically transferred to host front end 20 via disk or may be provided to host front end 20 via a communication link.

KCA 12 programs user tokens 26 with encrypted session control data (including cryptographic keys) that are unique for each user token 26. User tokens 26 are desirably physically small modules or components which may be easily inserted into and removed from remote terminals 14. In a preferred embodiment, user tokens 26 are implemented in conventional credit card sized, relatively inexpensive, mass market PCMCIAs. Each user of a remote terminal 14 who wishes to engage in remote communication sessions with host 22 is issued his or her own user token 26. Since session control data are stored within user tokens 26 in an encrypted form, user tokens 26 are not security critical items for system 10.

Remote terminals 14 may also be implemented using conventional mass market laptop computers. Thus, remote terminals 14 may include conventional computer components, such as disk drives, displays, and the like. In addition, remote terminals 14 include at least one user input device 28. A user of remote terminal 14 may directly manipulate user input device 28 to provide remote terminal 14 with data known to the user. By using user input device 28, this data known to a user need not be fixed in a tangible medium, such as disk, read only memory, paper, and the like, where it would be vulnerable to discovery by unauthorized persons. Examples of user input devices include a keyboard, a mouse or other pointing device, a microphone, and the like.

Generally, a remote terminal 14 with an installed user token 26 serves as a calling node in a communication session with host 22. The remote terminal 14 places a call to host computer 16, which serves as a called node. Host front end 20 then cooperates with user token 26 to establish the communication session. System 10 validates a user based partially upon encrypted data stored in user token 26. Token 26 is a tangible object which an authentic user possesses. Validation is also based partially upon a crypro-uncovering agent. The crypto-uncovering agent is something intangible that an authentic user knows. This uncovering agent does not exist in electronic form anywhere within the host computer 22, the token 26, or the host front end 20. It is unique to the individual user of the system and associated with one and only one user token 26. No control or session data are sent in plain text form through network 18. Security cannot be breached unless a user token 26, its encrypted data stored therein, and the crypto-uncovering agent are all divulged. Moreover, such breaches may be limited in scope, and entirely eliminated when the compromise is reported. Unauthorized access to a user token 26 or to host front end 20 will not allow an adversary to create new session control data or to modify existing session control data.

Figure 2:
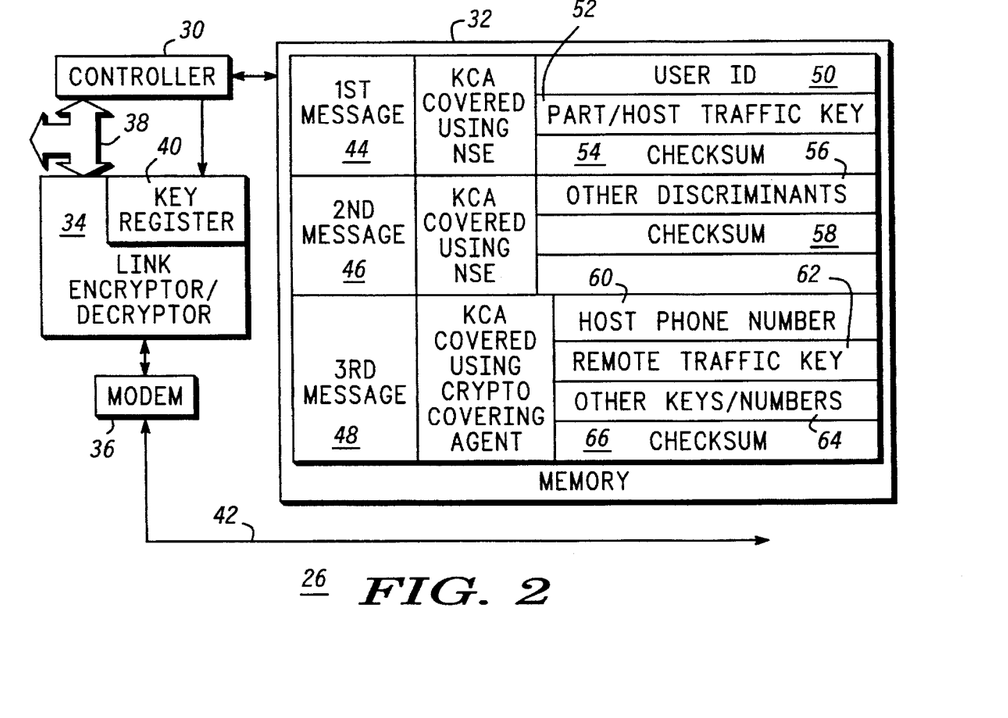
FIG. 2 shows a block diagram of a user token configured in accordance with the teaching of the present invention.

FIG. 2 shows a block diagram of a user token 26. User token 26 includes a controller 30, a memory 32, a link encryptor/decryptor 34, and a modem 36. Controller 30 couples to memory 32 and to link encryptor/decryptor 34. Link encryptor/decryptor 34 couples to modem 36. Controller 30 controls the operation of user token 26. Link encryptor/decryptor 34 is controlled by storing appropriate traffic keys in a key register 40 thereof. Desirably, key register 40 is a volatile memory device which loses its contents when power is removed from user token 26, such as occurs when token 26 is not installed in remote terminal 14. The key register 40 is also cleared at the termination of a user session (log-off). Link encryptor/decryptor 34 encrypts and decrypts data flowing between remote terminal 14 and communications network 18 (see FIG. 1) in response to the traffic keys stored in key register 40. Controller 30 may control the operation of modem 36 either through or around link encryptor/decryptor 34. Controller 30 communicates with remote terminal 14 and user input device 28 (see FIG. 1) thereof through a bus 38. Link encryptor/decryptor 34 also couples to bus 38, and modem 36 has an output 42 which couples to communication network 18.

Memory 32 includes various volatile and non-volatile sections. Volatile sections of memory 32 lose data stored therein when power is removed from user token 26, such as occurs when token 26 is not installed in remote terminal 14. Non-volatile sections may record programming instructions which controller 30 executes in controlling the operation of user token 26. In addition, non-volatile regions of memory 32 are configured to store, among other things, a first message 44, a second message 46, and a third message 48. Messages 44, 46, and 48 together provide the session control data which are programmed into user token 26 in an encrypted form by KCA 12 (see FIG. 1).

First message 44 and second message 46 are individually encrypted, or covered, by a non-symmetric encryption (NSE) process known only to KCA 12. The NSE process is characterized by separate and distinct cryptographic keys for the encrypt and decrypt operation. Revealing one member of the key pair does not reveal any information related to the second key. For the preferred embodiment, the encryption key is only known by the KCA 12. The decryption key is known by both the KCA 12 and host front end 20. Such use of NSE results in the fact that only the KCA 12 can create valid user tokens 26. Thus, the host front end 20, if able to correctly decrypt (read) a message, is assured that the message came from a valid user token 26.

Third message 48 is covered by a remote encryption process which is incompatible with the NSE process. The two encryption processes are incompatible because, given a key usable with either process, one cannot decipher the data encrypted by the other process.

First message 44 includes, in encrypted form, a user identity (ID) 50, a remote terminal split portion of a host traffic key 52, and a tamper detection checksum 54. User ID 50 uniquely identifies the user to whom token 26 has been assigned. The jurisdiction of user ID 50 is limited to KCA 12, user token 26, and host front end 20. Desirably, nothing within the domain of host 22 is aware of user ID 50. Host traffic key 52 is used in encrypting and decrypting session data between host computer 16 (see FIG. 1) and remote terminal 14 (see FIG. 1 ). Note that only a portion of the host traffic key 52 is contained in this message. This portion is unusable unless combined with an associated portion 78 contained in the memory 74 within the file host front end 20. Checksum 54 is used to determine whether the other data within first message 44 has been altered since originally encrypted by the KCA 12.

Second message 46 includes, in NSE encrypted form, a variety of other discriminants 56 which may be used to validate the user and/or limit the scope of the user's access within host 22 (see FIG. 1). Other discriminants 56 may include biometric information, an expiration date for user token 26, a user privilege vector which defines access scope for the user, and the like. In addition, second message 46 includes a tamper detection checksum 58 computed over the other discriminants. Note that the first message 44 and the second message 46 can only be read by the host front end 20. Other elements of the system such as the user terminal 14, user token controller 30, the host 22, or even an adversary stealing the user token 26, cannot read the message contents because they do not have access to the NSE decrypt key.

Figure 5:
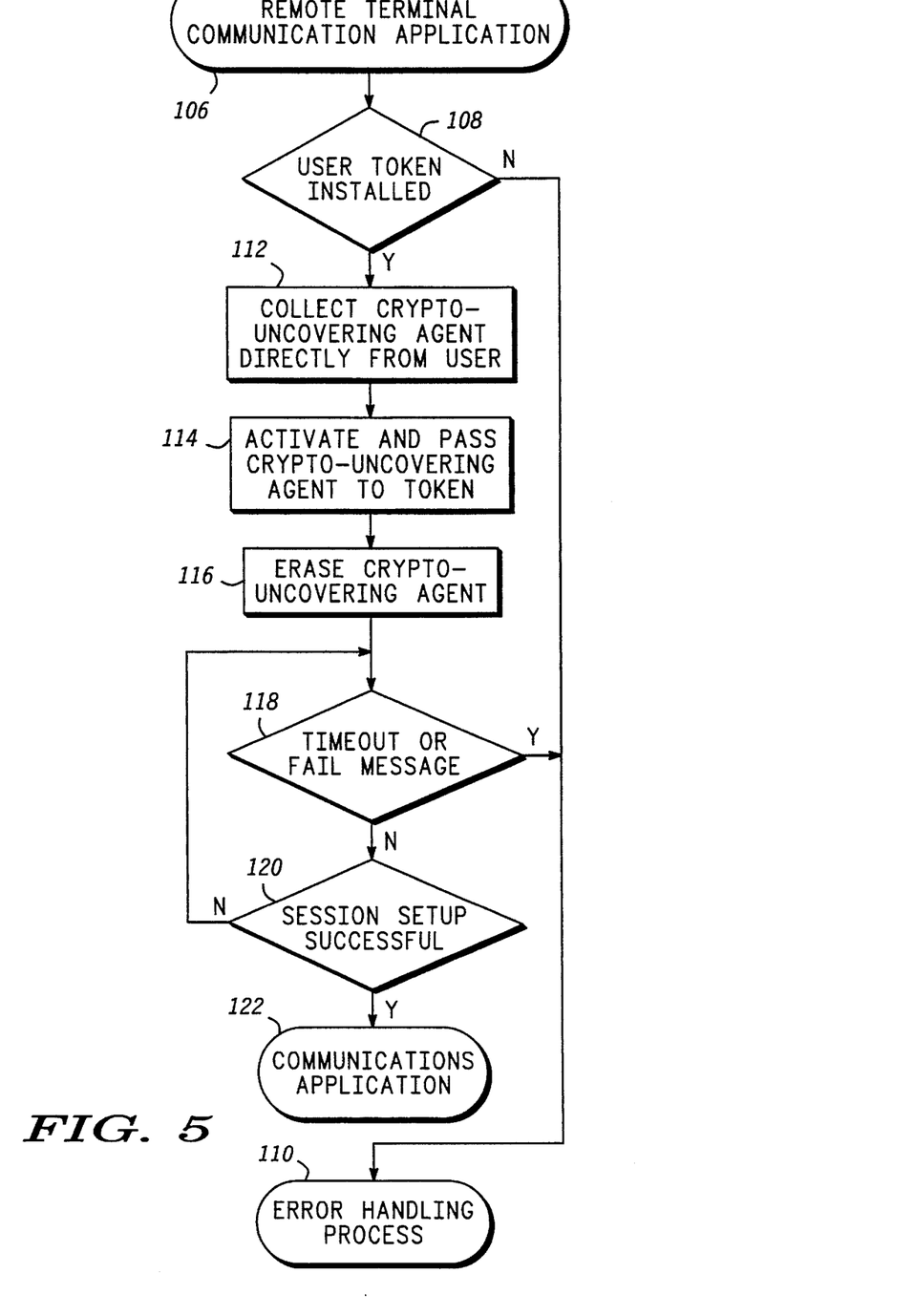
FIG. 5 shows a flow chart of a remote terminal communication application performed by a remote terminal of the computer system.

Third message 48 includes, in encrypted form, a phone number 60 for host computer 16, a remote traffic key 62 which is used to encrypt and decrypt session data at remote terminal 14, other keys and numbers 64, and a tamper detection checksum 66. These items are encrypted using the crypto uncovering agent as the cryptographic key. The encrypt/decrypt algorithm or process may be the same as the session encrypt/decrypt process, performed by the link encryptor/decryptor 82, but this is not mandatory. Other processes may also be used. The significant requirement is that the uncovering process cannot be successfully performed unless specifically allowed by the rightful owner of the user token 26. This operation is allowed by the rightful user inputting the crypto-uncovering agent into the user token 26, as shown in FIG. 5. After deciphering, host phone number 60 is dialed into communications network 18 by user token 26 to establish a communication session with host computer 16. Other keys and numbers 64 may include, for example, a phone number and encryption key used for communication with KCA 12. Checksum 66 is computed over phone number 60, remote traffic key 62, and other keys and phone numbers 64.

Figure 3:
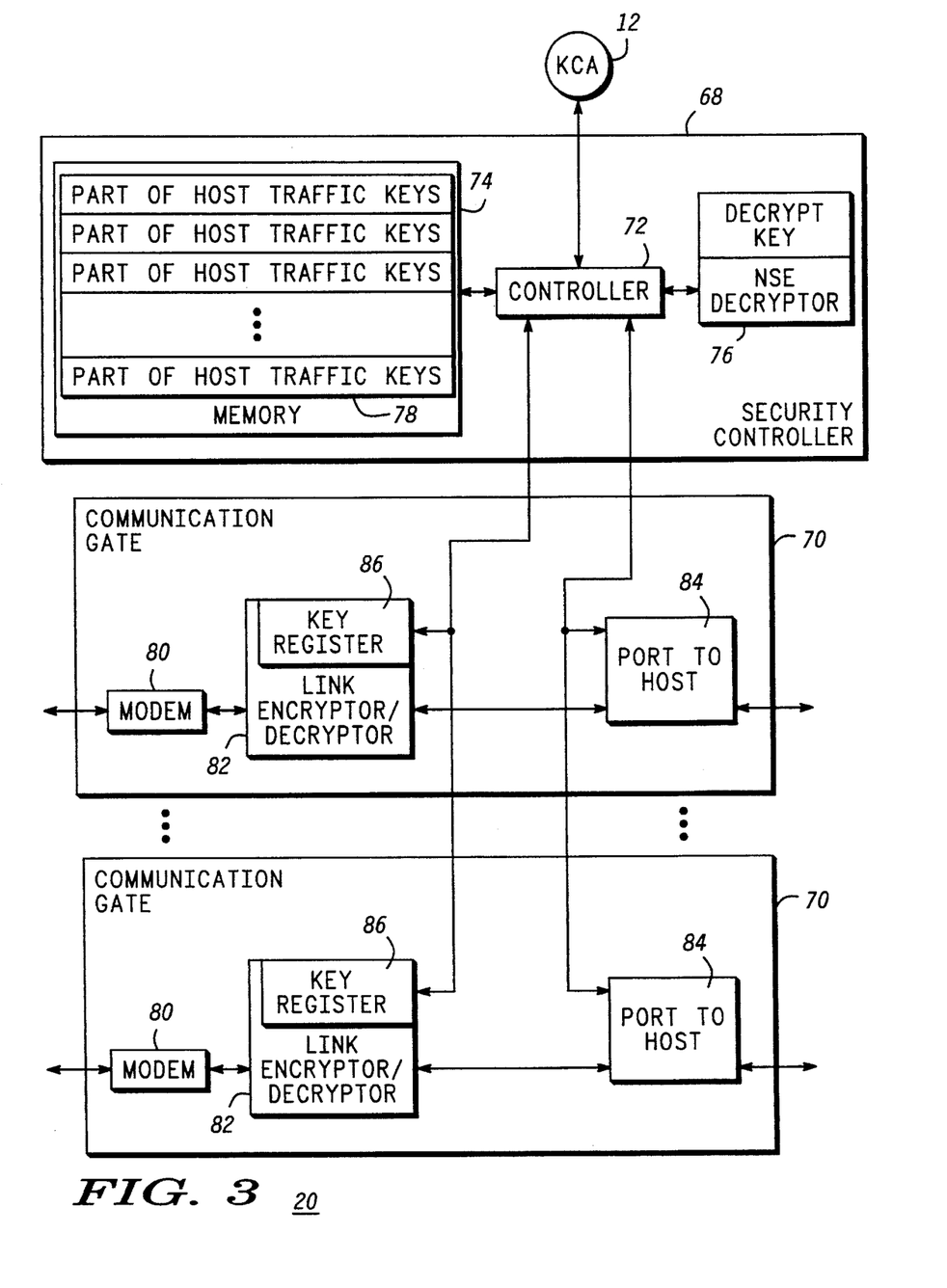
FIG. 3 shows a block diagram of a host front end configured in accordance with the teaching of the present invention.

FIG. 3 shows a block diagram of host front end (HFE) 20. HFE 20 includes a security controller 68 and any number of similarly configured communication gates 70. Desirably, one communication gate 70 is provided for each independent, simultaneous communication session that may be supported by host computer 16 (see FIG. 1).

Security controller 68 includes a controller 72, which couples to a memory 74 and a NSE decryptor 76. Controller 72 is a programmable device which executes programming instructions (not shown) stored in memory 74. In addition to programming instructions, memory 74 is configured to store a table 78 of host split portions of host traffic keys. Desirably, table 78 is indexed by user IDs, such as user IDs 50 (see FIG. 2) stored in various user tokens 26. The contents of table 78 are supplied to security controller 68 from KCA 12.

NSE decryptor 76 is programmed with a global NSE decryption key that decrypts the NSE encryption process performed by KCA 12 on first and second messages 44 and 46 (see FIG. 2). In the preferred embodiment, one decryption key can decrypt the NSE encryption of any user token 26. However, should security be breached and this decryption key be discovered, an adversary could only decipher encrypted first and second messages 44 and 46. The adversary could not perform the actual NSE encryption process to create new session control data.

A communication gate 70 includes a modem 80, which couples to communications network 18 (see FIG. 1). Modem 80 also couples to a link encryptor/decryptor 82. Link encryptor/decryptor 82 couples to controller 72 of security controller 68 and to a pod 84, which couples to host 22 through bus 24. Controller 72 compiles host traffic keys which are loaded in a key register 86 of link encryptor/decryptor 82 before a communication session may commence.

Figure 4:
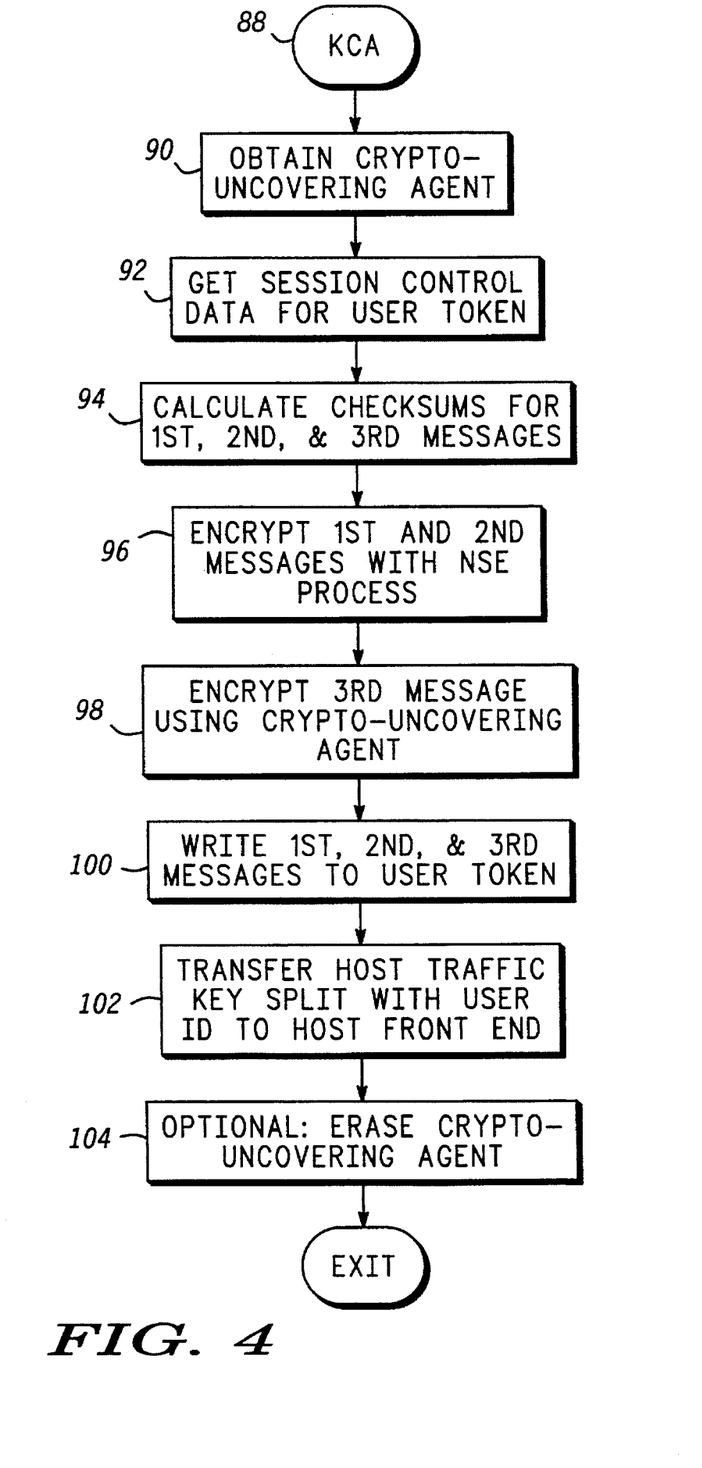
FIG. 4 shows a flow chart of a key certification agency (KCA) process performed by a key certification agency of the computer system.

FIG. 4 shows a flow chad of a KCA process 88 performed by KCA 12 (see FIG. 1). In preferred embodiments of the present invention, KCA process 88 is defined by computer programming installed on KCA 12. Generally, KCA process 88 is performed to program a user token 26 (see FIG. 1) with session control data personalized to a particular user.

KCA process 88 performs a task 90 to obtain a crypto-uncovering agent. The crypto-uncovering agent represents data which is known to an authorized user of a remote terminal 14 (see FIG. 1) and is unlikely to be known to or discovered by adversaries. The user may specify a suitable crypto-uncovering agent. Desirably, the crypto-uncovering agent is not data that will be written down or otherwise recorded in a tangible medium. Moreover, the crypto-uncovering agent is desirably no more than several characters long so that it may be easily memorized by a user and so that it has a high chance of being entered successfully by the user through user input device 28 (see FIG. 1).

As will become apparent, the crypto-uncovering agent is not used as a password or personal identification number. The crypto-uncovering agent is neither known by nor transferred, in either an encrypted or plain text form, to host computer 16 (see FIG. 1). While the crypto-uncovering agent may temporarily pass into remote terminal 14 and user token 26, it is not retained therein. Nothing in system 10 performs a comparison activity to determine whether a crypto-uncovering agent has been correctly entered at a user input device 28. Since the crypto-uncovering agent is so little known and transferred within the jurisdiction of system 10, it is less vulnerable to discovery and compromise than a password.

After task 90, a task 92 gets the appropriate session control data for the user. The session control data include the items in first, second, and third messages 44, 46, and 48 (see FIG. 2). This data may be known to and computed in KCA 12 as necessary to appropriately validate the user, dial host computer 16, and establish encryption keys for symmetrical encryption.

Next, a task 94 calculates tamper detection checksums 54, 58, and 66 for messages 44, 46, and 48, respectively. While the preferred embodiments literally perform mathematical checksum operations, those skilled in the art will appreciate that other equivalent operations may be performed as well. Generally checksums, including such equivalent other operations, calculate a number in response to certain data over which the checksum is calculated. If these data later change, a checksum operation performed on the changed data will most likely yield a changed checksum.

After task 94, a task 96 encrypts first and second messages 44 and 46 (see FIG. 2) with the NSE process known only to KCA 12. In non-symmetric encryption (NSE) a decryption key is known only to the recipient. In this case, the encryption key is unknown outside of KCA 12. Desirably, the NSE process used in task 96 is sufficiently robust so that an adversary has substantially no reasonable chance of decrypting the encrypted data without first knowing the proper decryption key. This allows a valid decryption to be cryptographically traced to KCA 12. Otherwise, the specific NSE algorithm used by task 96 is not critical.

Next, a task 98 encrypts third message 48 (see FIG. 2) using the crypro-uncovering agent obtained above in task 90 and an encryption process which is incompatible with the NSE process performed above in task 96. The precise algorithm used in task 98 is not critical.

After task 98, a task 100 writes first, second, and third messages 44, 46, and 48 (see FIG. 2) to user token 26. At this point, a user may physically take user token 26 with him or her. A task 102 occurs sometime after task 100. Task 102 transfers the host split portion of the host traffic key along with the user ID assigned to the user token 26 to host front end 20 to be stored in table 78 (see FIG. 3). As depicted in an optional task 104, KCA process 88 may erase the crypro-uncovering agent because it is no longer needed within system 10.

FIG. 5 shows a flow chart of a remote terminal communication application 106 performed by remote terminals 14. Application 106 may, for example, represent a conventional personal computer application software program which may be executed on a laptop computer. Application 106 is performed when a user launches the application from an operating system (not shown) for remote terminal 14.

Application 106 performs a query task 108 to determine whether a user token 26 is presently installed in remote terminal 14. If user token 26 is not installed, application 106 performs an error handling process 110. Error handling process 110 may display an appropriate message on a display of remote terminal 14. For this situation, such a message may explain that a communication session with host computer 16 cannot occur because no user token 26 is installed in remote terminal 14. After completion of process 110, program control may return to the operating system.

When task 108 determines that a user token 26 is installed, a task 112 displays appropriate prompts and collects the crypro-uncovering agent directly from the user. The crypro-uncovering agent is provided to remote terminal 14 through a user's manipulation of user input device 28 (see FIG. 1). After task 112, a task 114 activates the installed user token 26 and passes the crypro-uncovering agent to token 26. Next, a task 116 erases all traces of the crypto-uncovering agent within remote terminal 14 to lessen the already low likelihood of the agent's discovery within remote terminal 14.

After task 116, a query task 118 determines whether a time out has occurred or whether a failed setup message has been received from token 26. The time out function determines whether a predetermined period of time has transpired without receiving any response from token 26. If the time out occurs or a failed setup message is received from token 26, program control proceeds to error handling process 110. No communication session can take place until the user re-launches application 106.

When task 118 determines that no time out has occurred yet and no fail message has been received from token 26, a query task 120 determines whether a session setup successful message has been received from token 26. If this message has not been received, program control loops back to task 118. When task 120 eventually detects the successful setup message, a communications application 122 is performed. Communications application 122 desirably includes conventional functions included in mass market communications application programs. However, application 122 may differ from such conventional applications by not including capabilities for modem control, such as dialing instructions and the like. Program control remains in communications application 122 for as long as the communication session continues. When the communication session ends, program control may pass to the operating system.

Figure 6:
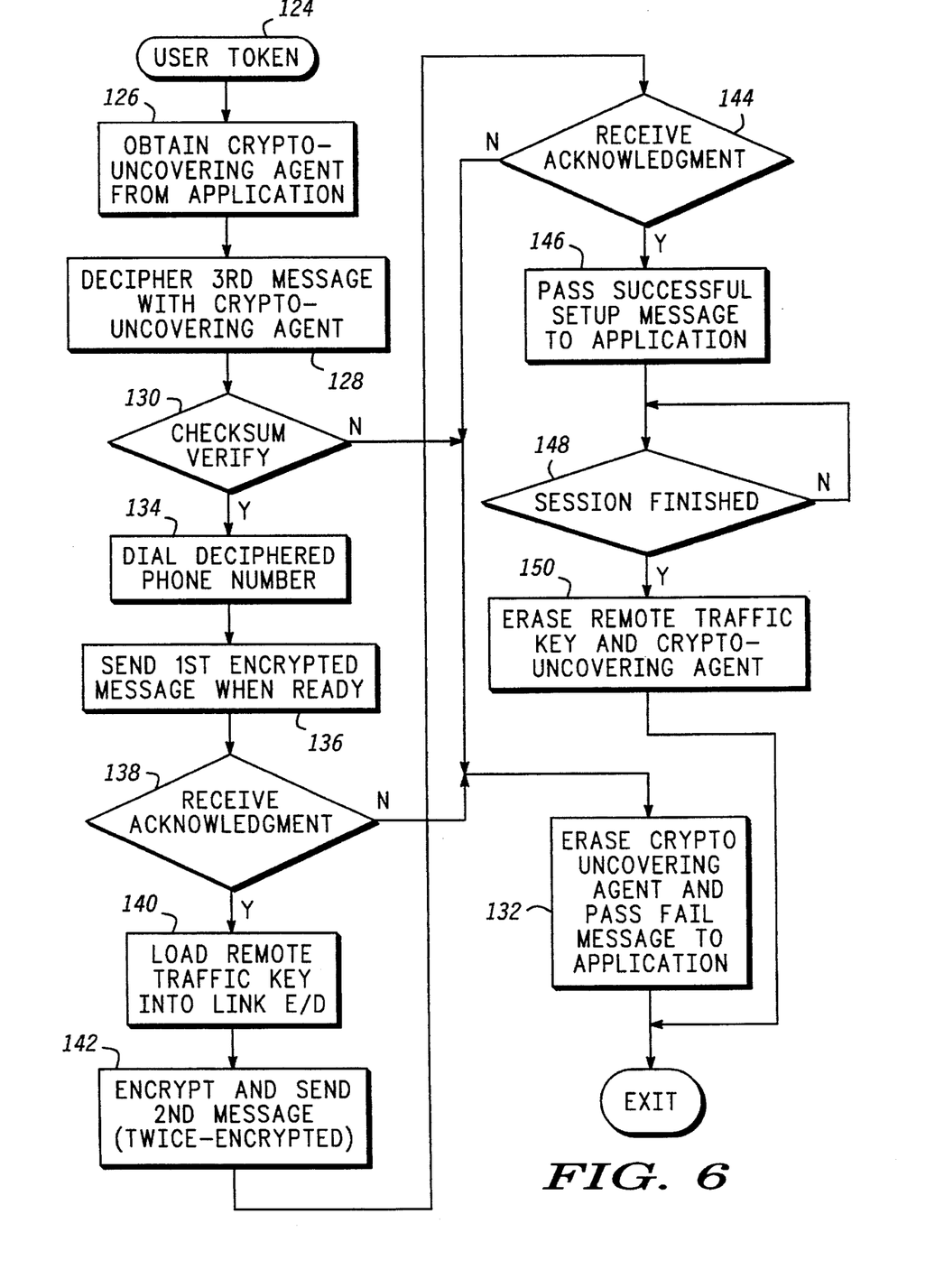
FIG. 6 shows a flow chart of a user token process performed by the user token.

FIG. 6 shows a flow chart of a user token process 124 performed by user token 26. User token 26 is installed within remote terminal 14 before process 124 is performed. In addition, a communication link, such as a phone line, should be connected to token 26. Process 124 is performed when token 26 is activated from application 106, as discussed above in connection with task 114 (see FIG. 5). Upon activation, process 124 may perform certain initialization activities (not shown), such as causing link encryptor/decryptor 34 to refrain from encrypting or decrypting data flowing therethrough.

Process 124 performs a task 126 to obtain the crypto-uncovering agent from application 106 (see FIG. 5). Task 114 (see FIG. 5) of application 106 passes the crypro-uncovering agent to token 26 after the agent has been collected from the user. Next, a task 128 deciphers third message 48 (see FIG. 2) in response to the crypro-uncovering agent to obtain a deciphered host phone number 60, deciphered remote traffic key 62, and deciphered checksum 66 (see FIG. 2). The deciphering, decrypting, or uncovering operation performed in task 128 complements the encrypting process performed by KCA process 88 in task 98 (see FIG. 4).

After task 128, a query task 130 calculates a checksum over deciphered third message 48 (see FIG. 2). Task 128 then compares this newly calculated checksum to deciphered checksum 66 (see FIG. 2) to determine whether the checksum can be verified. The checksum calculation performed in task 130 is substantially the same as the corresponding calculation performed by KCA process 88 in task 94 (see FIG. 4). The checksum will fail to verify when an incorrect crypto-uncovering agent is used or when the data contained in third message 48 has been altered. When task 130 fails to verify the checksum, a task 132 is performed to construct and pass an appropriate failure message back to application 106 (see FIG. 5). Task 118 (see FIG. 5) of application 106 detects the failure message. After task 132, program control exits user token process 124. No communication session will be setup with host computer 16.

When task 130 verifies checksum 66 (see FIG. 2) in third message 48 (see FIG. 2), a task 134 dials deciphered host phone number 60 (see FIG. 2). As a result of dialing this number, a connection with the called node, which is host computer 16, is established. Task 134 contemplates conventional modem control techniques (not shown) related to detecting dial tone, busy signals, answer, verifying a modem tone, and other conditions which may indicate the failure to establish a connection. When the connection cannot be established as a result of task 134, an appropriate failure message may be passed back to application 106 (see FIG. 5) and program control may exit process 124.

After task 134 establishes a connection with the called node, a task 136 sends first encrypted message 44 (see FIG. 2) to the called node. Task 136 may perform modem training, such as baud rate determination, echo cancellation, and the like so that first message 44 is sent only after the communication link is firmly established. Token 26 has no way to decrypt first message 44, and first message 44 is sent in its encrypted form as stored in memory 32. In addition, no additional encryption is applied to first message 44 by token 26 so that host computer 16 receives the same data which were generated by KCA process 88 in task 96 (see FIG. 4).

Next, a query task 138 determines whether an acknowledgment has been received from host computer 16. Program control may remain at task 138 for a time out duration before concluding that no acknowledgment is received, or task 138 may detect the receipt of a failure message in lieu of an acknowledgment message from host computer 16. Those skilled in the art will appreciate that task 138 may detect a no-acknowledgment message which is interpreted as an instruction to re-send the previous message, and task 138 may comply with these instructions before concluding that no acknowledgment is forthcoming. When no acknowledgment message is forthcoming from host computer 16, program control proceeds to task 132 to construct and pass a failure message back to application 106 (see FIG. 5) and exit process 124.

When task 138 detects the acknowledgment from host computer 16, a task 140 loads deciphered remote traffic key 62 into key register 40 of link encryptor/decryptor 34 (see FIG. 2). From this point on, all data communicated between remote terminal 14 and host computer 16 will be encrypted and decrypted in response to remote traffic key 62 by link encryptor/decryptor 34.

After task 140, a task 142 encrypts and sends second message 46 to host computer 16. The encryption is performed in link encryptor/decryptor 34. Since second message 46 is stored in encrypted form in memory 32, it becomes twice encrypted as a result of task 142. Next, a query task 144 operates in a manner similar to task 138 to await an acknowledgment message from host computer 16. If the acknowledgment message is not forthcoming, program control proceeds to task 132 to construct and pass an appropriate failure message back to application 106 (see FIG. 5). When task 144 detects the receipt of an acknowledgment to second message 46 from host computer 16, a task 146 constructs and passes a setup successful message back to application 106, where it is detected at task 120 (see FIG. 5).

At this point the communication session has been successfully setup, and data communications may commence in accordance with the performance of communications application 122 (see FIG. 5). These data communications may include the transmission of passwords and other precautions which may be required by software in host 22 (see FIG. 1). All session control data passed between remote terminal 14 and host computer 16 to successfully setup the communication session have been encrypted. Moreover, the crypto-uncovering agent has not been transmitted even in an encrypted form. During the communication session, no data flow between remote terminal 14 and host computer 16 without being encrypted. Consequently, the communication session and its setup process are relatively invulnerable to eavesdropping.

While the communication session is on-going, a query task 148 determines whether the session is finished. Task 148 may make its determination by monitoring modem 36 to detect a dial tone or on-hook condition. When task 148 detects the end of the communication session, a task 150 erases all traces of deciphered remote traffic key 62 stored in key register 40 of link encryptor/decryptor 34 and in memory 32 and any traces of the crypto-uncovering agent which may remain in memory 32 (see FIG. 2). This lessens the likelihood of unwanted discovery. After task 150, program control exits process 124.

Figure 7:
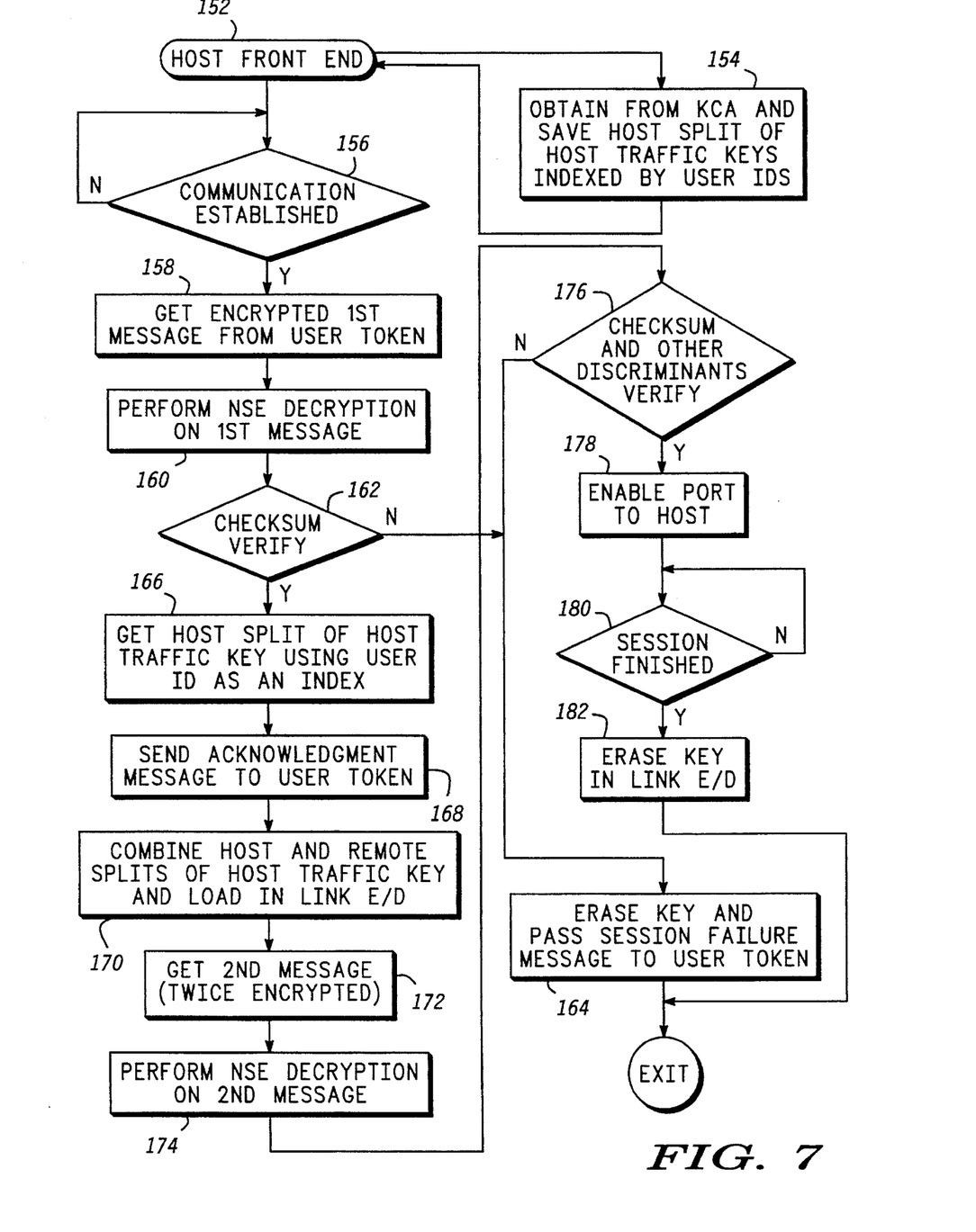
FIG. 7 shows a flow chart of a host front end process performed by the host front end.

FIG. 7 shows a flow chart of a host front end process 152 performed by host front end (HFE) 20 of host computer 16 (see FIGS. 1 and 3). As indicated at a task 154, process 152 obtains the host splits of host traffic keys from KCA 12. The host splits represent portions of the encryption traffic keys used by HFE 20 during communication sessions with various remote terminals 14. A different key split is used for each user token 26, and the key splits may be distinguished from one another by the user ID 50 (see FIG. 2) stored in each token 26. Thus, task 154 saves the host splits in table 78 (see FIG. 3) indexed by user ID so that they may be retrieved when the corresponding communication sessions are initiated by remote terminals 14. Task 154 is performed in response to task 102 of KCA process 88.

HFE process 152 is activated for each incoming call received at a modem 80 of a communication gate 70 (see FIG. 3). Accordingly, process 152 may simultaneously be active many times in various states to handle many different incoming calls. Process 152 performs a query task 156 to determine when communication has been firmly established. Thus, program control proceeds past task 156 to a task 158 when modem training has been completed.

Task 158 gets the encrypted first message 44 (see FIG. 2) sent to HFE 20 by a user token 26. Task 158 is performed in response to task 136 of user token process 124 (see FIG. 6). When first message 44 has been obtained, a task 160 performs an NSE decryption process on encrypted first message 44. Task 160 uses a global decryption key supplied by KCA 12 which will work with first and second messages 44 and 46 from any user token 26. Task 160 may use NSE decryptor 76 (see FIG. 3) to perform an operation which compliments the NSE encryption process performed by KCA process 88 in task 96 (see FIG. 4).

After NSE decryption, a query task 162 verifies checksum 54 from first message 44 (see FIG. 2). Task 162 operates similarly to task 130 (see FIG. 6). If task 162 fails to verify checksum 54, program control proceeds to a task 164. Task 164 constructs an appropriate session failure message and passes the message back to the calling user token 26. The calling user token 26 will detect this failure message at task 138 (see FIG. 6). In addition, task 164 may cause the subject modem 80 (see FIG. 3) to terminate the call. After task 164 program control may exit process 152 for this call. However, process 152 will remain active for other ongoing calls.

When task 162 verifies checksum 54, a task 166 gets the host split of a host traffic key. The host split is stored in table 78 (see FIG. 3) and is selected from among many host splits by using deciphered user ID 50 (see FIG. 2) as an index. User ID 50 was decrypted above in task 160. Next, process 152 performs tasks 168 and 170. Task 168 sends an acknowledgment message to the calling user token 26. This acknowledgment message will be detected by the calling token 26 at task 138 (see FIG. 6). Task 170 combines the host split of the host traffic key with the remote split of the host traffic key to obtain a complete host traffic key. This complete host traffic key is loaded in the key register 86 of the communication gate 70 (see FIG. 3) handling the call. All subsequent data communication flowing between the remote terminal 14 and host computer 16 will be encrypted and decrypted in a link encryptor/decryptor 82 (see FIG. 3) in response to the combined host traffic key.

After task 170, a task 172 awaits the arrival of second message 46 (see FIG. 2) from the calling token 26. This token 26 sends second message 46 at task 142 (see FIG. 6). As discussed above, the second message 46 is twice encrypted. An outer level of decryption is performed automatically at HFE 20 by link encryptor/decryptor 82 (see FIG. 3). A task 172 then performs the NSE decryption process to decipher an inner level of encryption.

After task 174, a query task 176 determines whether the discriminants 56 and checksum 58 (see FIG. 2) included in second message 46 can be verified. The other discriminants may include biometric data and token expiration dates. In addition, the other discriminants may include a privilege vector which may be passed to host 20 (see FIG. 1) so that host 20 can limit access within the jurisdiction of host 20 as specified by the privilege vector. If discriminants 56 or checksum 58 cannot be verified, program control proceeds to task 164 to send a failure message to the token 26 and to exit process 152.

When task 176 verifies discriminants 56 and checksum 58, system 10 has a high degree of confidence that an authentic user is attempting to engage in a communication session and that the appropriate traffic keys have setup. Thus, when discriminants 56 and checksum 58 verify, a task 178 enables port 84 to allow data communication to flow between remote terminal 14 and host 22. At this point, the communication may commence. As discussed above, all data flowing during the session will be encrypted.

After task 178, a query task 180 monitors the call to determine when the session is finished. When the session is finished, a task 182 erases all traces of the combined host traffic key and the deciphered remote split of the host traffic key 52 (see FIG. 2) stored in key register 86 and elsewhere. After task 182, program control exits process 152.

In summary, the present invention provides an improved method and apparatus for secure remote communication sessions. The present invention provides both authentication and session security. Mobility of a remote terminal is promoted because no security-critical components are included in the remote terminal and no call-back process is required. The user token installed in a remote terminal is a small and relatively inexpensive component. The present invention also promotes ease of use by host computer and remote terminal users. Security is provided by a KCA, HFE, and token system which operates independently of the host. Remote terminal users are required only to remember and enter a crypro-uncovering agent. Security is provided without making assumptions or imposing requirements upon the host.

The present invention has been described above with reference to preferred embodiments. However, those skilled in the art will recognize that changes and modifications may be made in these preferred embodiments without departing from the scope of the present invention. For example, in one alternate embodiment the process described herein as being performed in the user token may be performed within the remote terminal itself. In addition, those skilled in the art will understand equivalent systems and methods may be implemented using wide deviations from the nature and sequencing of the specific tasks described herein. These and other changes and modifications which are obvious to those skilled in the art are intended to be included within the scope of the present invention.

What is claimed is:

1. A method for operating a calling node to provide security for a communication session between said calling node and a called node, said method comprising the steps of:
    a) storing encrypted user identifying data at said calling node;
        a1) storing an encrypted portion of a called node traffic key at said calling node;
    b) storing an encrypted calling node traffic key at said calling node;
    c) sending said encrypted user identifying data from said calling node to said called node;
        c1) sending said encrypted portion of said called node traffic key from said calling node to said called node;
    d) obtaining a crypto-uncovering agent from a user of said calling node; and
    e) deciphering said encrypted calling node traffic key in response to said crypto-uncovering agent to obtain a deciphered calling node traffic key.

2. A method as claimed in claim 1 wherein:
    said step e) additionally comprises the step of deciphering a phone number in response to said crypto-uncovering agent to obtain a deciphered phone number; and
    said method additionally comprises, prior to said step of sending, the step of dialing said deciphered phone number to establish a connection to said called node.

3. A method as claimed in claim 1 wherein:
    said step b) additionally comprises the step of storing an encrypted tamper detection checksum with said encrypted calling node traffic key;
    said step e) additionally comprises the step of deciphering said encrypted tamper detection checksum; and
    said method additionally comprises the step of verifying said checksum after said step e).

4. A method for operating a calling node to provide security for a communication session between said calling node and a called node, said method comprising the steps of:
    a) storing encrypted user identifying data at said calling node;
        a1) storing an encrypted portion of a called node traffic key;
    b) storing an encrypted calling node traffic key at said calling node;
    c) sending said encrypted user identifying data from said calling node to said called node;
        c1) sending said encrypted portion of said called node traffic key to said called node;
    d) obtaining a crypto-uncovering agent from a user of said calling node;
    e) deciphering said encrypted calling node traffic key in response to said crypto-uncovering agent to obtain a deciphered calling node traffic key; and
    f) decrypting data received at said calling node from said called node using said deciphered traffic key.

5. A method for operating a calling node to provide security for a communication session between said calling node and a called node, said method comprising the steps of:
    a) storing encrypted user identifying data at said calling node;
    b) storing an encrypted traffic key at said calling node;
    c) sending said encrypted user identifying data from said calling node to said called node;
    d) obtaining a crypto-uncovering agent from a user of said calling node;
    e) deciphering said encrypted traffic key in response to said crypto-uncovering agent to obtain a deciphered traffic key;
    f) encrypting said user identifying data in accordance with a first cryptography process; and
    g) encrypting said traffic key in accordance with a second cryptography process, wherein said first and second processes are incompatible with one another.

6. A method for operating a calling node to provide security for a communication session between said calling node and a called node, said method comprising the steps of:
   a) storing encrypted user identifying data at said calling node;
      a1) including said user identifying data in a first message;
      a2) storing an encrypted second message at said calling node;
   b) storing an encrypted traffic key at said calling node;
   c) sending said encrypted user identifying data from said calling node to said called node;
   d) obtaining a crypto-uncovering agent from a user of said calling node;
   e) deciphering said encrypted traffic key in response to said crypto-uncovering agent to obtain a deciphered traffic key;
   f) encrypting said encrypted second message in response to said deciphered traffic key to produce a twice-encrypted message; and
   g) sending said twice-encrypted message to said called node.

7. A remote terminal for providing security for a communication session between said remote terminal and a host computer, said remote terminal comprising:
   a first memory region containing encrypted user identifying data and an encrypted portion of a host traffic key;
   a second memory region containing an encrypted remote terminal traffic key;
   a modem for sending said encrypted user identifying data from said remote terminal to said host computer;
   a user input device for obtaining a crypto-uncovering agent from a user of said remote terminal;
   a controller coupled to said user input device, said first and second memory regions, and said modem for deciphering said encrypted remote terminal traffic key in response to said crypto-uncovering agent to obtain a deciphered remote terminal traffic key and for sending said encrypted user identifying data and said encrypted portion of said host traffic key to said host computer through said modem.

8. A remote terminal as claimed in claim 7 additionally comprising a link decryptor coupled to said controller for decrypting data received at said remote terminal from said host computer in response to said deciphered remote terminal traffic key.

9. A remote terminal as claimed in claim 7 wherein:
   said second memory region additionally contains an encrypted phone number and said controller is additionally used for deciphering said phone number in response to said crypto-uncovering agent to obtain a deciphered phone number; and
   said controller is cooperatively configured with said modem to dial said deciphered phone number to establish a connection to said host computer.

10. A remote terminal as claimed in claim 7 wherein:
    said user input device is included in a portable personal computer; and
    said first and second memory regions, said modem, and said controller are included in a token which is removably installable in said portable personal computer, said token being unable to retain said deciphered traffic key within said token when said token is not installed in said portable personal computer.

11. A remote terminal for providing security for a communication session between said remote terminal and a host computer, said remote terminal comprising:
    a first memory, region containing encrypted user identifying data, said user identifying data being encrypted in accordance with a first cryptography process;
    a second memory, region containing an encrypted traffic key, said traffic key being encrypted in accordance with a second cryptography process, said first and second processes being incompatible with one another;
    a modem for sending said encrypted user identifying data from said remote terminal to said host computer;
    a user input device for obtaining a crypto-uncovering agent from a user of said remote terminal; and
    a controller coupled to said user input device, said first and second memory regions, and said modem for deciphering said encrypted traffic key in response to said crypto-uncovering agent to obtain a deciphered traffic key.

12. A method of operating a computing system having a key certification agency, a host computer, and a remote terminal to provide security for communication sessions between said remote terminal and said host computer, said method comprising the steps of:
    a) at said key certification agency, encrypting user identifying data using a first encryption process, encrypting a remote traffic key using a second encryption process, and storing said encrypted user identifying data and said encrypted remote traffic key in a component of said remote terminal;
    b) at said remote terminal, obtaining a crypro-uncovering agent from a user of said remote terminal, deciphering said remote traffic key in response to said crypto-uncovering agent, and sending said encrypted user identifying data to said host computer; and
    c) at said host computer, deciphering said encrypted user identifying data, and obtaining a host traffic key in response to said deciphered user identifying data.

13. A method as claimed in claim 12 wherein:
    said step a) additionally comprises the steps of encrypting a portion of said host traffic key using said first encryption process and storing said encrypted portion of said host traffic key in said component of said remote terminal;
    said step b) additionally comprises the step of sending said encrypted portion of said host traffic key to said host computer; and
    said step c) additionally comprises the steps of deciphering said encrypted portion of said host traffic key and obtaining said host traffic key in response to said deciphered user identifying data and said deciphered portion of said host traffic key.

14. A method as claimed in claim 12 additionally comprising the steps of:
    at said host computer, encrypting and decrypting data communicated between said remote terminal and said host computer using said host traffic key; and
    at said remote terminal, encrypting and decrypting data communicated between said remote terminal and said host computer using said deciphered remote traffic key.

* * * * *